United States Patent
Malkowski, Jr. et al.

(10) Patent No.: US 6,795,320 B2
(45) Date of Patent: Sep. 21, 2004

(54) METHOD AND APPARATUS FOR SUPPLYING DATA AND POWER TO PANEL-SUPPORTED COMPONENTS

(75) Inventors: Chester Malkowski, Jr., Franklin, WI (US); G. Erich Heberlein, Jr., Oconomowoc, WI (US); Steven J. Litzau, Greendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/302,310

(22) Filed: Nov. 22, 2002

(65) Prior Publication Data

US 2003/0072144 A1 Apr. 17, 2003

Related U.S. Application Data

(63) Continuation of application No. 09/406,506, filed on Sep. 28, 1999, now Pat. No. 6,487,091.

(51) Int. Cl.$^7$ ............................................. H02B 1/20
(52) U.S. Cl. ..................... 361/826; 361/825; 361/797; 361/796; 361/730; 257/99
(58) Field of Search ............................. 361/826, 825, 361/816, 800, 730, 796, 797, 752; 257/99

(56) References Cited

U.S. PATENT DOCUMENTS

| | | | |
|---|---|---|---|
| 3,715,627 A | 2/1973 | D'Ausilio | ..................... 317/99 |
| 4,717,357 A | 1/1988 | Greenwood | ................ 439/492 |
| 5,501,605 A | 3/1996 | Ozaki et al. | .................. 439/34 |
| 5,507,668 A | 4/1996 | Lambrinos et al. | ......... 439/502 |
| 5,931,688 A | 8/1999 | Hasz et al. | ................. 439/247 |
| 6,039,596 A * | 3/2000 | Whiteman et al. | .......... 439/404 |
| 6,179,644 B1 | 1/2001 | Adams et al. | ............. 439/387 |
| 6,220,874 B1 | 4/2001 | Kurata et al. | ............. 439/76.2 |
| 6,320,128 B1 | 11/2001 | Glovatsky et al. | ......... 174/52.2 |
| 6,592,395 B2 * | 7/2003 | Brown et al. | ............... 439/405 |

OTHER PUBLICATIONS

Fildlider et al., Permanent store semiconductor memory unit, Apr. 1981, Derwent Information LTD, 1982–09686E.

* cited by examiner

Primary Examiner—David Martin
Assistant Examiner—Hung S Bui
(74) Attorney, Agent, or Firm—Fletcher Yoder; Alexander M. Gerasimow

(57) ABSTRACT

A technique for supplying power and data signals to panel-mounted components includes distribution of power and data conductors in a trunk wireway and further distribution to component locations via drop cable assemblies disposed in drop wireways. The drop cable assemblies and trunk cable assemblies may include identical cable. The cables have a plurality of parallel conductors in an insulated jacket. Connectors are mounted on the drop cable assemblies for receiving plug-in component cable assemblies routed to individual components mounted within component panels or bays. The components are thus electrically coupled in parallel with one another and may receive both power and data signals via the drop and trunk cable assemblies coupled to a network. Individual components may be independent installed and removed for servicing with interrupting service to upstream or downstream components in the system.

28 Claims, 10 Drawing Sheets

METHOD AND APPARATUS FOR SUPPLYING DATA AND POWER TO PANEL-SUPPORTED COMPONENTS

This application is a Continuation of application Ser. No. 09/406,506 filed Sep. 28, 1999, now U.S. Pat. No. 6,487,091.

BACKGROUND OF THE INVENTION

1. Field of the Invention

The present invention relates generally to the field of electrical component panels and techniques for interconnecting power and data conductors in such panels. More particularly, the invention relates to a technique for providing multiple plug-in connections in a panel or cabinet structure through a wiring topography which can be readily and economically installed to provide a highly flexible and reliable device infrastructure.

2. Description of the Related Art

A wide range of electrical devices are assembled and interconnected in panels, cabinetry, enclosures, and the like. Traditionally, switch gear has been mounted on panels within enclosures and interconnected via individual wires run between terminals of each switch gear component. Troughs or conduits may be provided between the components to protect the wires and to facilitate both installation and servicing. Where electrical power and data signals are exchanged between external circuitry and the enclosed components, separate conductors have commonly been routed, with power conductors often separated physically within the enclosures to avoid potential for interference and short circuits, and to conform to industry standards and codes.

In a special type of electrical component assembly, commonly referred to as a motor control center or MCC, three phase power and data signals are exchanged between panel-mounted components and external circuitry. In this exemplary application, special wireways are provided for routing wiring separate from regions in which the components are mounted. Where low-level power is provided for sensors, controllers, actuators, and the like, these are sometimes grouped in twisted conductor sets with data conductors. In such cases, all power and data conductors are individually terminated at both ends to wire the components to one another and to the external circuitry. Where an industrial control network is employed to interface with the components, the wiring topography may provide for "daisy chaining" the components to one another in a series fashion. Higher power electrical supply is routed separately, with power conductors being fed through power buses, typically three-phase buses, and connected to line-side terminals of relays, switches, contactors, and the like.

A number of drawbacks exist in conventional wiring topographies of the type described above and the resulting systems. For example, where wires are individually terminated, they must generally be stripped and installed in a time-consuming process. Where multiple power and data conductors are provided in a cable assembly, such assemblies are often shielded, requiring the removal of a portion of the shield prior to termination of the individual conductors. In systems where insulation-piercing components are used to facilitate termination, the conductors may still require shielding to be removed and individual conductors to be laid out in a desired manner in the connectors.

Additional drawbacks result from the topography adopted in conventional conductor-terminated systems. For example, where components are individually wired and "daisy chained" to one another removal of an upstream component, such as for servicing, can result in the need to temporarily disconnect all downstream components. Depending upon the application, therefore, down time of the downstream components, as well as other components in the system can result. In extreme cases, removal of a component can require interruption of entire operations or processes.

Heretofore known wiring techniques and topographies also pose difficulties when used in conjunction with higher power circuits in a single enclosure or panel. For example, industry standards may require specific physical spacing between higher voltage power conductors and lower voltage instrumentation lines. Where wireways in the component enclosures do not offer such separation, arrangements must be made to accommodate the conductors and to maintain the desired separation. Again, this can imply a relatively time-consuming operation that affects the overall cost of the system, both upon installation and during later servicing.

There is a need, therefore, for an improved technique for interconnecting components in electrical systems, such as MCC's and the like. There is, in particular, a present need for a wiring topography which is relatively time-efficient to install and service, and which offers flexibility in interfacing with a wide range of components, as well as in removal of components during servicing with a minimal amount of disruption to other components and systems.

SUMMARY OF THE INVENTION

The present invention provides a wiring topography technique designed to respond to these needs. The technique may be employed in a wide range of systems, particularly in systems in which a number of electrical components are coupled to power and data conductors for remote control and monitoring operations. The technique is particularly well suited to MCC's and similar panel-mounted systems in which both higher power conductors and instrumentation-level conductors are routed in wireways or on the surface of support panels for feeding power and command signals to components and for retrieving feedback signals via data conductors.

The inventive topography is based upon provision of primary or trunk conductors in a first routing level, and drop or tap conductors in a second level. The trunk conductors are preferably provided in a flat cable which can be installed with mating connectors via insulation-piercing conductive elements. The drop conductors may be provided in similar flat cable which is interfaced with the trunk cable to feed a number of locations within the system. The drop cables may be installed in wireways which meet a wireway of the trunk cable to provide a clean and straightforward infrastructure during installation and later servicing. Connectors on the drop cable may also be installed via insulation-piercing conductive elements. The connectors on the drop cables facilitate interfacing with components via plug-in sockets.

The basic infrastructure established by the wiring topography may be installed during initial configuration of the system. In a preferred embodiment, the trunk and drop cables are pre-installed in corresponding wireways, with sockets being exposed for receiving plugs directly to the mounted components. The components may be separately mounted, such as on removable panels, or directly installed in the enclosure on fixed supports. The components may then be interfaced with the drop and trunk cable conductors via plugs. For later servicing, individual components can be unplugged and removed or replaced without interrupting service to upstream or downstream components, or to the drop or trunk cables.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
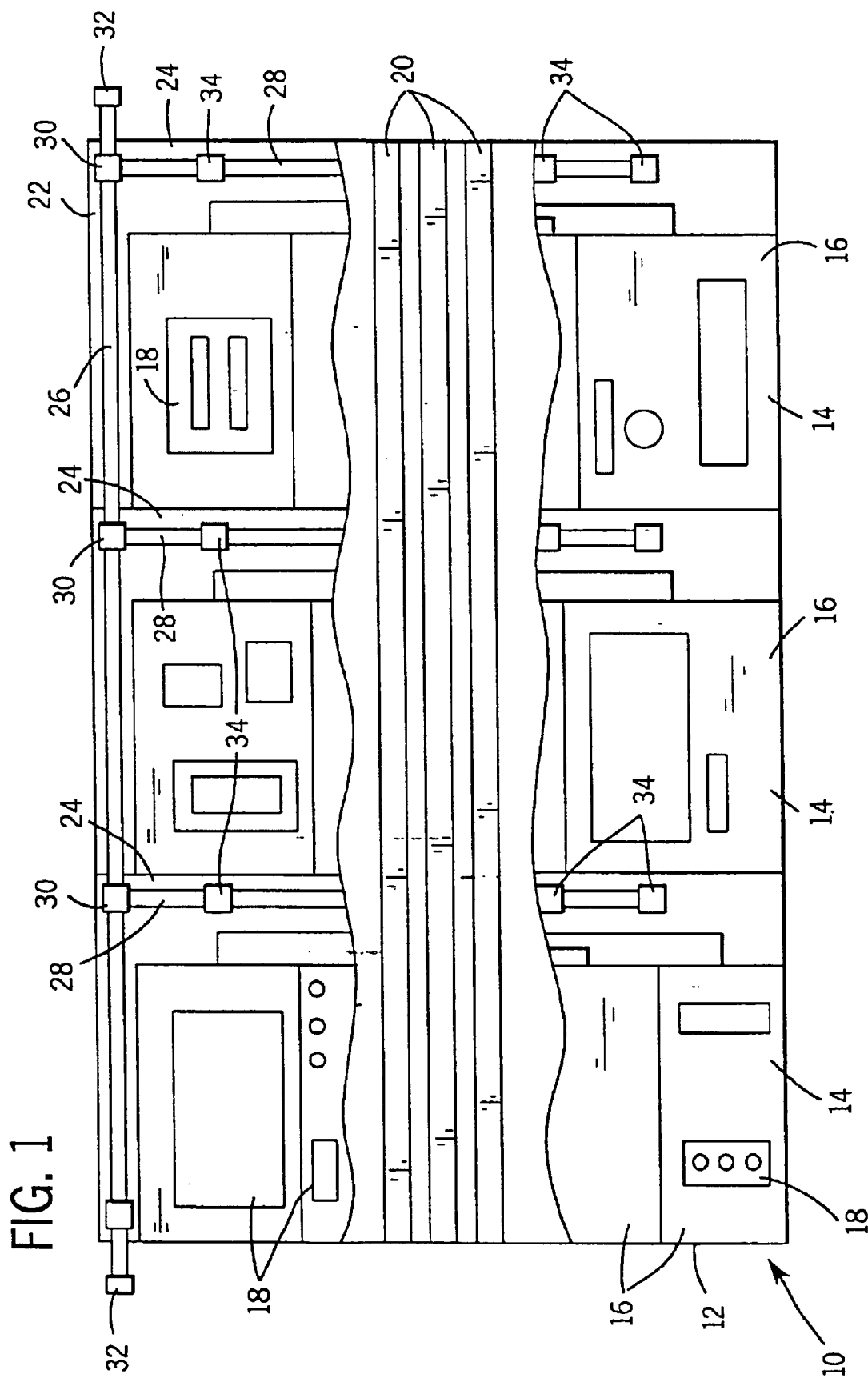
FIG. 1 is a partially cut-away view of a networked electrical enclosure in the form of a motor control center (MCC) in accordance with certain aspects of the present technique.

Turning now to the drawings, and referring first to FIG. 1, a networked electrical system 10 is illustrated as including an enclosure 12 consisting of a series of bays 14. Each bay includes one or more component mounting panels 16 on which individual electrical components 18 are supported. While various enclosures of this type may be networked and wired in accordance with the present technique, the technique is particularly well suited to such systems as motor control centers (MCCs), and the like. In such systems, various control components, such as motor drives, relays, contactors, and so forth, are interconnected for remote sensing and actuation of automated equipment. In a typical factory setting, one or more such MCC installations may be made to control a large number of material handling, manufacturing, packaging, processing, and other equipment.

In the illustrated embodiment, devices requiring single or three-phase AC power are supplied with such power via a series of power buses 20 extending behind panels 16. Power wiring is then routed from bus interface components (not shown) to these devices in a conventional manner. Certain of the components within system 10, however, are designed to be powered via a low-voltage (e.g. 24 volt) DC power supply, and to receive and transmit data via a pre-established data protocol such as the DeviceNet protocol established by Allen-Bradley Company, LLC of Milwaukee, Wis.

In the illustrated topography, such power and data signals are transmitted via a series of cables and connectors which can be pre-installed and easily interfaced with system components at the time they are mounted or serviced. Thus, a trunk wireway 22 extends along enclosure 12, such as in an elevated position near the top of the enclosure. A series of drop wireways 24 extend from the trunk wireway along each bay 14. A trunk cable assembly 26 is provided within the trunk wireway 22, while a drop cable assembly 28, coupled to the trunk cable assembly 26, extends through each drop wireway 24. The trunk cable assembly 26 interfaces with each drop cable assembly 28 via a splice cable and connector 30 which provides electrical continuity between power and data conductors of the trunk and drop cables as described more fully below. Moreover, interface connectors 32 may be provided at one or both ends of the trunk cable assembly 26 to allow network connections between adjacent or interconnected systems or enclosures. Component connectors 34 are provided along each drop cable assembly 28 to facilitate interconnection of the network cables with individual components within bays 14.

It should be noted that, while in the embodiment described herein the trunk cable assembly 26 and drop cable assemblies 28 are housed within wireways defined within the enclosure, the present technique is not intended to be limited to disposition of the cable assemblies within closed wireways, or to any particular mounting structure. For example, the trunk and drop cable routing may be performed within wireways which are mounted to the surface of a support, such as a panel. Similarly, the trunk and drop cable assemblies may be surface-mounted, being routed along the surface of a support, such as a panel. In such cases, the convenient snap-action installation described below may be adapted for the particular mounting scheme. The connector may also be configured with integral passages for mounting hardware, such as bolts or screws. Inserts may be molded into such passages of the connector body, and may be threaded to receive fasteners from either a front side of a support panel, or a rear side. Moreover, the cable itself may be supported within wireways, or across a mounting and support surface. It should also be noted that, while in the presently preferred embodiment described herein, the trunk cable is routed horizontally along an upper region of the enclosure, with the drop cables extending vertically from the trunk cable, various alternative orientations and placements of the cables within the enclosure may be envisaged. For example, a trunk cable may be provided in a central region of the enclosure, or in a lower region, with drop cables extending therefrom. Similarly, the orientation of the trunk cable and drop cables may be reversed, with the trunk cable extending vertically, and drop cables extending horizontally along component placement locations.

As will be appreciated by those skilled in the art, enclosure 12 will typically be formed of an assemblage of sheared and bent metal panels in accordance with standard industry specifications, such as NEMA standards. Moreover, trunk wireway 22 and drop wireways 24 may be routed through a rear section through which power buses 20 extend. Each wireway may include additional isolation barriers, such as a cover extending over the wireway. Finally, doors or enclosure covers (not shown) will typically be provided for permitting access to the components and wiring of the enclosure, while allowing the enclosure to be closed and secured when such access is not needed.

Figure 2:
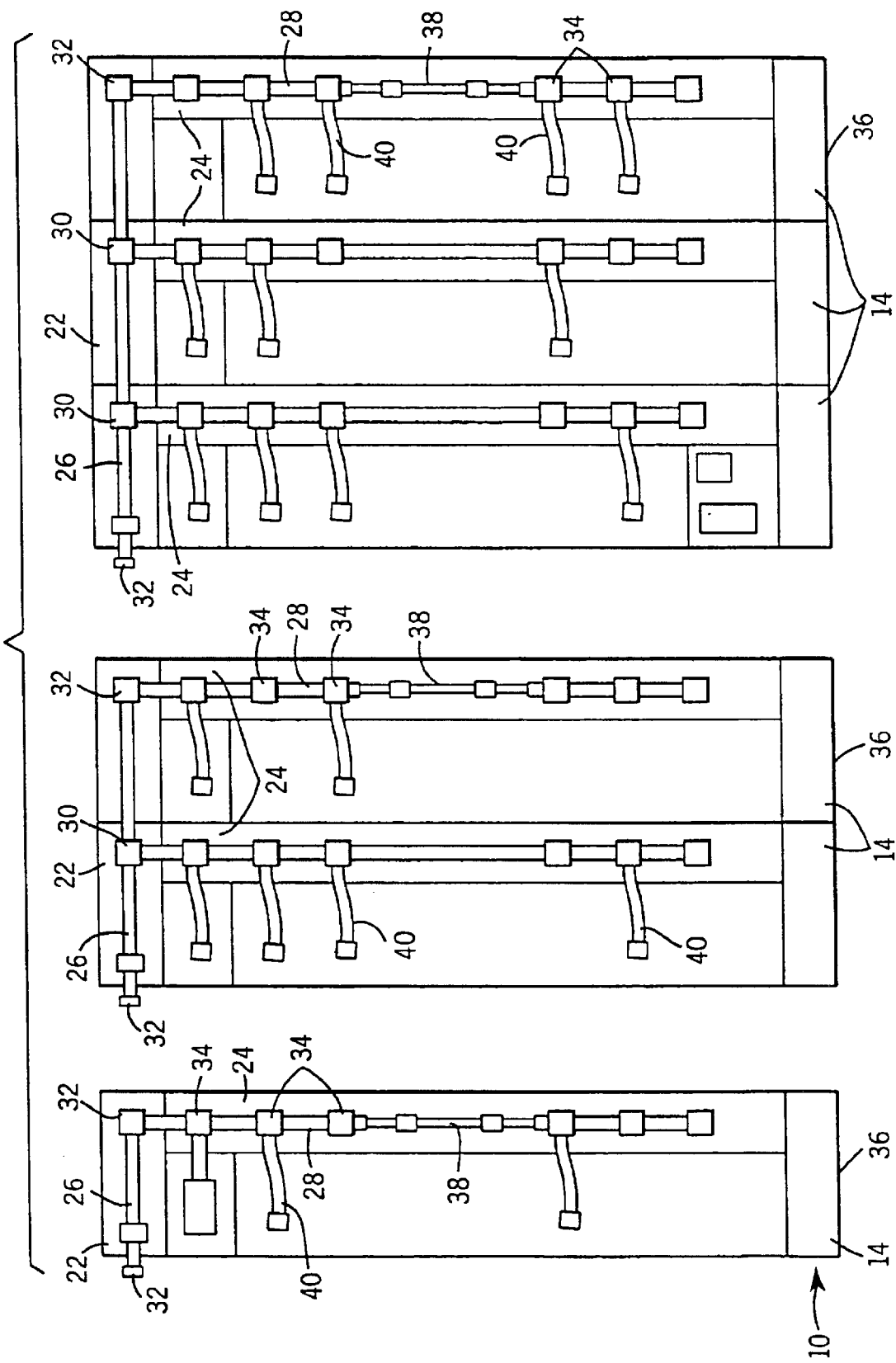
FIG. 2 is a view of a series of networked electrical enclosures designed to be coupled to one another for supplying data and power to electrical components.

The overall topography of the system 10 illustrated in FIG. 1 may be employed in a series of enclosures which may be coupled adjacent to one another, or which may be networked to one another, but spaced apart within an installation. FIG. 2 illustrates the adaptation of the topography for such installations. As shown in FIG. 2, system 10 may include a series of subsystem units, designated generally by the reference numeral 36, each including one or more bays 14 for mounting components networked via trunk cable assemblies 26 and drop cable assemblies 28. Connectors 30 are provided, as indicated above, for interfacing the trunk and drop cable assemblies with one another. In the embodiment of FIG. 2, interface connectors 32 may be combined, in certain instances, with the features of the connectors 30, to allow individual enclosures or systems to be networked to one another, providing electrical continuity between the trunk cable assemblies of each enclosure. Also shown in FIG. 2, where desired, individual drop cable assemblies 28 may be linked to one another via splice cables 38. Similar splice cables may be employed to link the drop cable assemblies 28 to the trunk cable assemblies 26. Alternatively, T-type connectors may be used for interfacing directly with the conductors of the trunk and drop cables.

In the illustrated topography, trunk cable assemblies 26 and drop cable assemblies 28 may employ identical cabling, preferably flat cabling incorporating parallel power and data conductors to which electrical connection may be made through insulation-piercing elements, as described below. Moreover, it should be noted that while heretofore known systems have often required individual termination of components, typically in a daisy-chain configuration, in a time-consuming installation operation, the present topography facilitates installation of the trunk and drop cable assemblies prior to mounting the components within the enclosure, with subsequent connections between the components and the drop cable assemblies being made via component cables 40 as illustrated generally in FIG. 2. As described more fully below, connectors 34 are preferably designed to be secured within a pre-fabricated panel, with component cable assemblies 40 being plugged into the connectors in a straightforward manner. Thus, individual components may be coupled to one another and to the network electrically in parallel, so as to reduce the need for removal of downstream components from the network in the event of servicing or replacement of upstream components.

Figure 3:
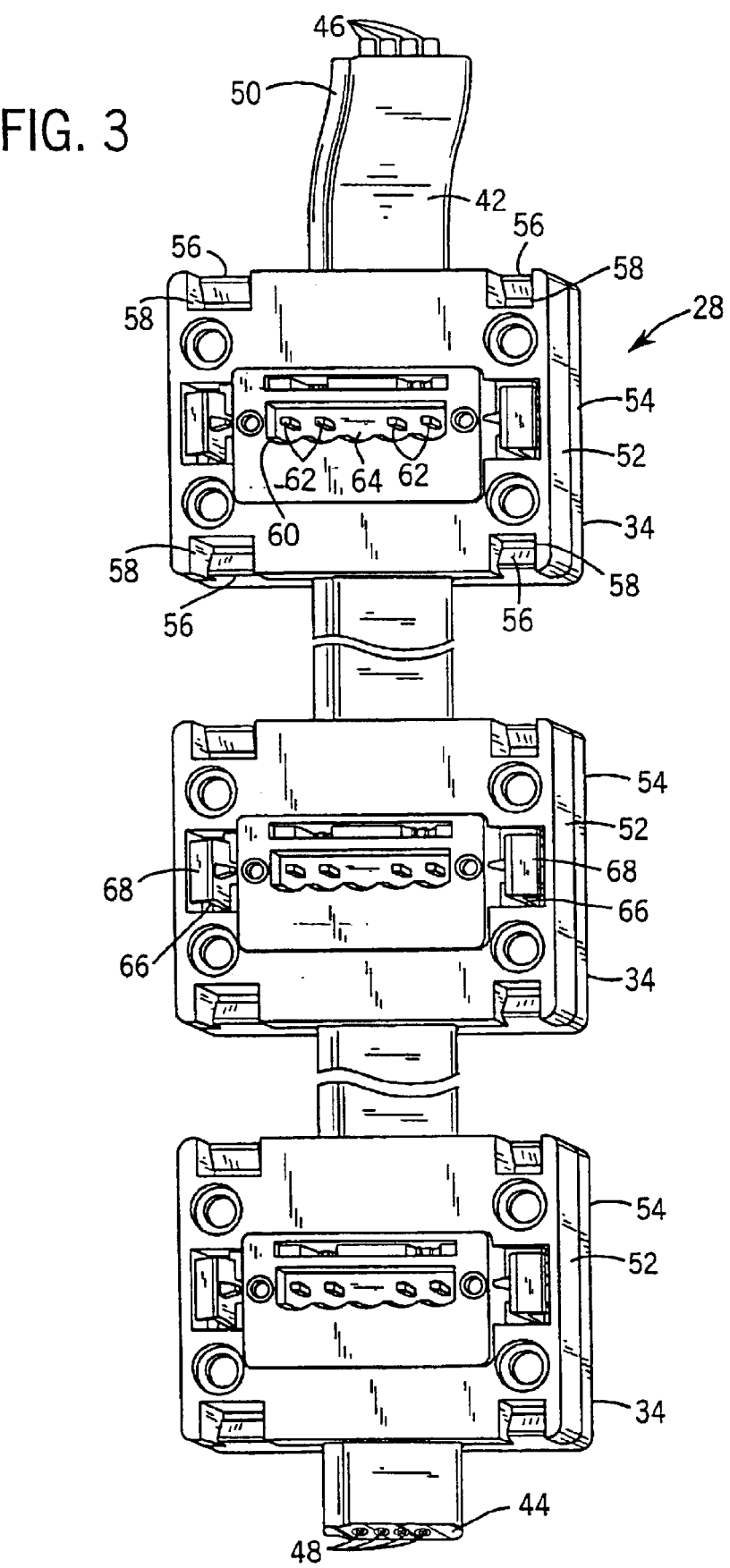
FIG. 3 is a perspective view of a series of component connector modules secured along a flat power and data cable for transmitting power and data in an enclosure of the type illustrated in FIGS. 1 and 2.

An exemplary embodiment of a drop cable assembly is shown in FIG. 3. As described below, the drop cable assembly is preferably physically configured during fabrication of individual support panels designed to be secured within the drop wireways. FIG. 3, however, illustrates such a drop cable assembly removed from the panel for explanatory purposes. As shown in FIG. 3, the drop cable assembly 28 includes a generally flat cable 42 which is formed of an insulative cable jacket 44 through which individual conductors 46 extend. Each conductor is further enveloped by an individual insulation layer 48. In the preferred embodiment, outer conductors of the flat cable serve for transmission of low voltage DC power (e.g. 24 volts DC), while the two inner conductors serve for transmission of digitized data. The cable jacket and insulation layers may be penetrated by insulation-piercing elements, as described below, for straightforward installation of the individual connectors 34 along the flat cable. A physical key 50 is provided along one edge of the flat cable for insuring proper physical orientation of the cable within the cable assembly and connectors.

Each connector 34 comprises a base element 52 secured to a cover 54 to capture a section of flat cable 42 therebetween, while permitting the cable to pass continuously through the connector. For assembly of the connector, a series of retaining clips 56 extend from cover 54 toward base 52, and are received within recesses 58 in corresponding locations of the base 52. Angled surfaces and retaining extensions of each retaining clip 56 contact surfaces of the base 52 within each recess to loosely secure the base and cover portions of each connector 34 around cable 42 during assembly. As described more fully below, the portions of the connector are ultimately secured to one another via fasteners, which also serve to drive conductive elements through the insulation layers of the cable to make contact with the conductors extending therethrough.

Each connector 34 is provided with an electrical interface for connecting a component of system 10 to the network cable. In the illustrated embodiment, the interface of each connector includes a socket 60 into which pins or conductors 62 extend from the base 52 of the connector. Socket 60 thus forms a recess 64 designed to receive a corresponding plug of a component cable, as described more fully below. Adjacent to the socket 60, each connector includes a pair of retaining arms 66 designed to secure the connector within a support panel aperture, also described below. Each retaining arm is formed as a resilient extension of base 52, including a projection 68 for causing deflection of the retaining arm and subsequent contact with a support panel.

Figure 4:
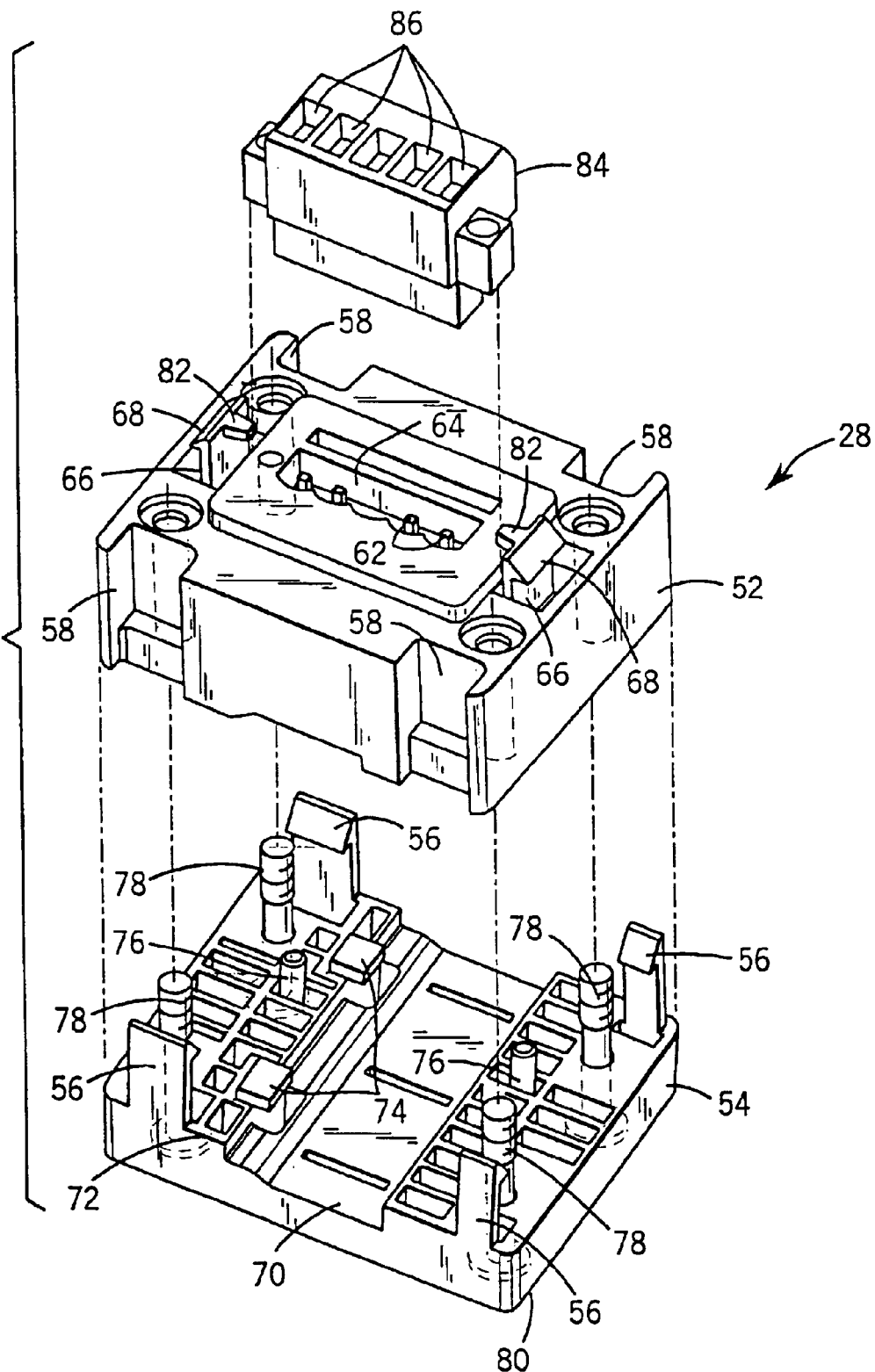
FIG. 4 is an exploded view of one of the connectors of the type illustrated in FIG. 3.

FIG. 4 illustrates the base and cover portions of connector 28, as well as an exemplary plug designed to be received within the socket of the connector. As shown in FIG. 4, base 52 interfaces directly with cover 54, such that resilient retaining clips 56 extend into recesses 58 to secure the components to one another during assembly. A cable receiving surface 70 is formed along a front side 72 of cover 54 for receiving the properly oriented flat cable (see cable 42 in FIG. 3). Cable securement projections 74 extend over a portion of the cable receiving surface 70 to loosely secure the cable within the cover during assembly. Alignment pins 76 are formed integrally with the cover, and are received within apertures of the base (see FIG. 5) to maintain proper alignment of the base and cover during assembly. Threaded fasteners 78 extend through cover 54 and are threaded directly into corresponding threaded apertures of the base, as described below. In the illustrated embodiment; fasteners 78 enter from a rear side 80 of the cover, thereby permitting access to the fasteners for easy assembly while base 52 is pre-installed in a support panel.

As indicated above, a set of retaining arms 66 are formed with base element 52 and may be elastically deflected for snapping the base into a corresponding aperture of a support panel. In addition to projections 68, which serve to retain the base within the panel, each retaining arm is also provided with an interference extension 82 designed to prevent removal of the connector once a component cable has been coupled to the connector socket. In the illustrated embodiment, a plug 84 is provided on each component cable, with a series of terminal openings 86 for receiving individual conductors of the component cable (not shown). The plug 84 has an extension which enters into recess 64 of connector base 52 to establish electrical continuity between the conductors 62 and corresponding conductors within the plug. Close clearance between interference extensions 82 and the plug, however, prevent the elastic deformation of retaining arms 66 once the plug is installed, thereby preventing the removal of the connector from a support panel. Where clearance between the retaining arms themselves and the plug is sufficiently close to prevent elastic deformation of the arms, extensions 82 may be reduced in size or eliminated.

Figure 5:
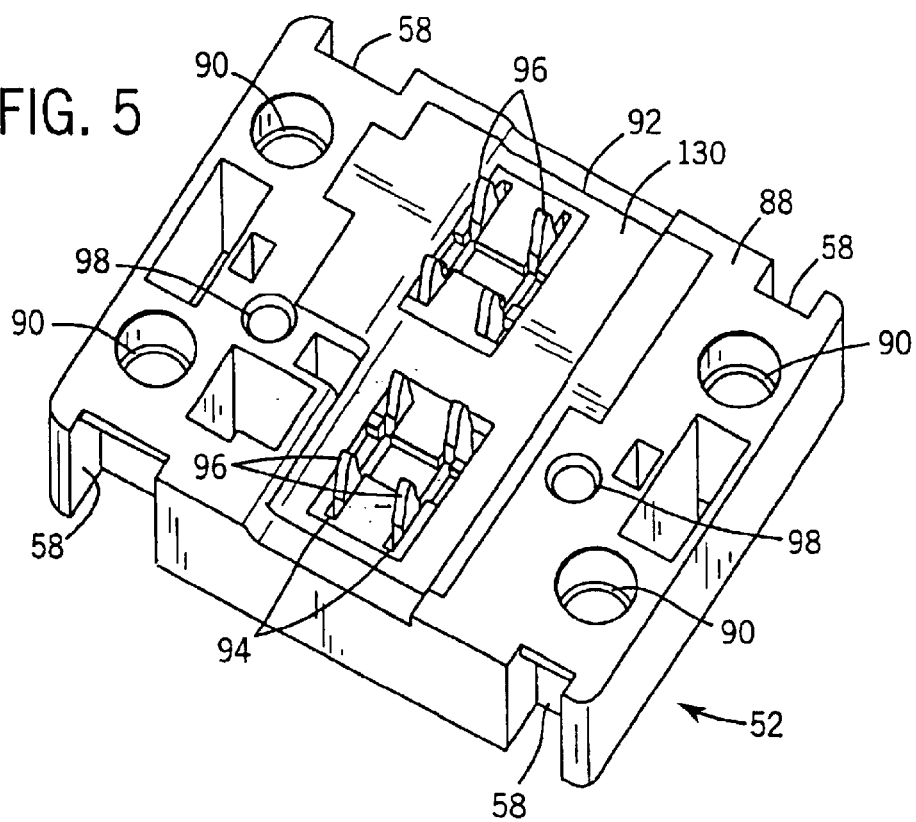
FIG. 5 is a perspective view of a bottom or rear side of one of the elements of the connector illustrated in FIG. 4 showing a preferred manner for establishing electrical contact with conductors of a network cable.

FIG. 5 illustrates components of base 52 viewed from a rear side 88. As indicated above, rear side 88 includes threaded apertures 90 for receiving fasteners 78 extending through cover 54 (see FIG. 4). A cable interface 92 is also provided on side 88 which, when base 52 is assembled with cover 54, overlies the cable receiving surface 70 of the cover. A series of conductors, in the form of insulation-piercing elements 94, extend upwardly from cable interface 92 for making contact with the conductors within the flat drop cable. Each conductor 94 includes one or more pointed teeth or projections 96 designed to pierce the insulation of the cable as well as the additional insulation layers which may be provided around each conductor of the cable. One conductor is provided within base 52 for each conductor of the cable to which electrical continuity is to be provided. Finally, a plurality of guide apertures 98 are provided in base 52 for receiving alignment pins 76 of the cover (see FIG. 4).

It should be noted that threaded apertures 90, or similar apertures, may serve to receive fasteners for securing the connectors to a support panel. Thus, the connector may be provided with snap-type securement means, such as those described above, as well as more conventional support structures, such as threaded inserts designed to receive fasteners extending through a support panel. Thus, the connector may be mounted in the convenient snap-action arrangement, typically behind a support panel as described below, or via fasteners, to position the connector either behind or in front of a support panel with respect to the access provided to the component cable receptacle.

Figure 5A:
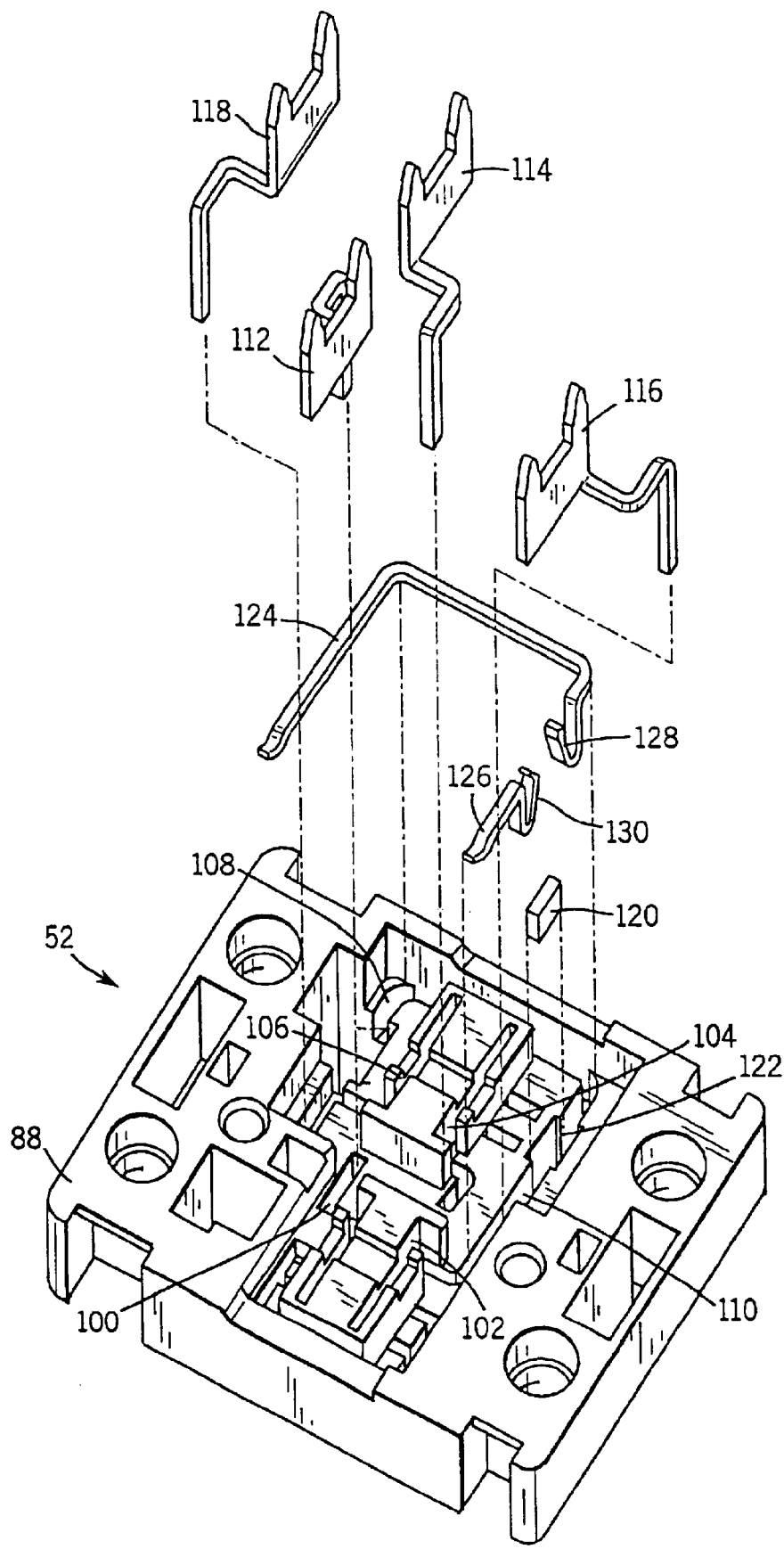
FIG. 5A is an exploded view of certain of the components shown in FIG. 5, illustrating a manner in which electrical power and data are routed through the connector.

FIG. 5A illustrates certain of the conductive elements of base 52 and the manner in which power and data signals are routed through the connector. As shown in FIG. 5A, routing recesses are provided within the body of base 52. These include recesses 100, 102, 104 and 106 for the conductive elements 94, as well as additional routing recesses 108 and 110 for conducting high and low DC bus voltage conductors within the connector. In the illustrated embodiment, conductive elements 94 are formed of single pieces of conductive material, such as copper, by stamping and bending operations. Each conductor, indicated by reference numerals 112, 114, 116 and 118 in FIG. 5A, are configured to form both the features required for piercing the insulation of the cable, as well as an integral pin for the conductor socket (see, e.g., pin 62 in FIG. 4). These conductive elements are then fitted into corresponding recesses of the base, with the pin end of the connectors extending through the base into the recess of the socket on the opposite side thereof. In the preferred embodiment illustrated, the conductive elements, once installed in the base 52, are fixed in position, and engage the cable by force exerted during attachment of the connector cover.

It should be noted that in the illustrated embodiment, the conductors are configured to reduce the overall number of different parts in the connector. This configuration permits the use of only two physically different conductive elements for completing connections to all four conductors of the flat cable. In particular, in the embodiment illustrated in FIG. 5A, conductive element 112 is identical to conductive element 114, while conductive element 116 is identical to conductive element 118. The distances between the insulation-piercing portion of the conductive elements and the pin extension are dimensioned such that the appropriate pin locations are provided, while enabling all conductors of the cable to be contacted upon assembly of the connector with the cable.

In the embodiment illustrated in FIG. 5A, outer conductive elements 116 and 118 are positioned to contact outer power bus conductors of the flat cable. To provide for additional stability in the potential difference across the cable bus conductors, a capacitor 120 is provided and electrically coupled in the connector base via additional conductors 124 and 126. In particular, conductor 124 routes power from conductive element 118, through recess 108, to a spring retaining end portion 128. In the assembled connector, conductor 124 lies beneath conductive element 118, completing contact with one side of the capacitor when installed. Conductor 126, similarly, is placed within recess 110, and completes electrical contact between conductive element 116 and an opposite side of capacitor 120. An additional spring retaining end 130 is provided on conductive element 126 for this purpose. Conductive elements 124 and 126 may be fitted within the assembly loosely, without the need for heat staking or other self securement means. With the conductors and capacitor in place, a permanent cover 130 is preferably fitted to the base to close the base and cover the recesses through which the conductors are routed (see FIG. 5).

Figure 6:
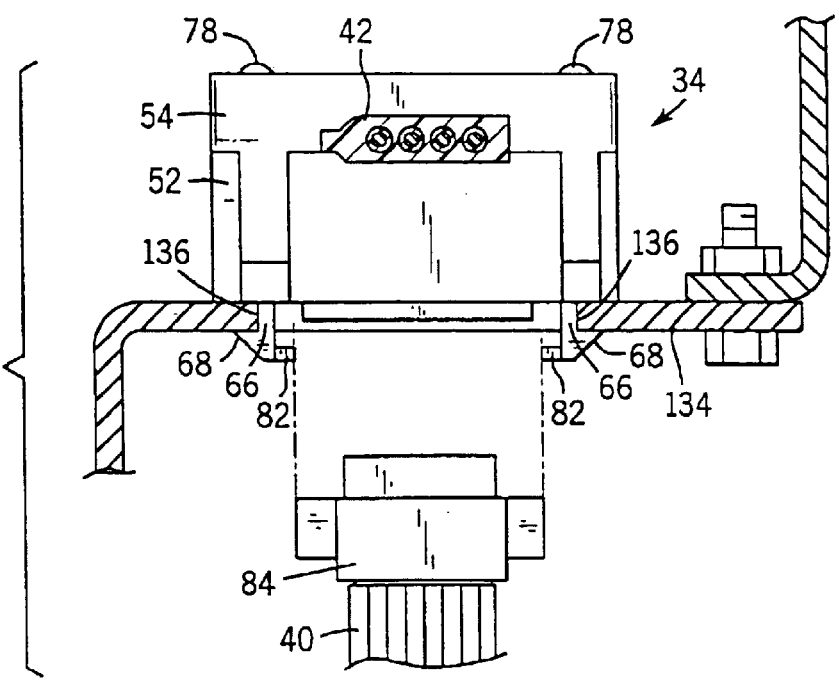
FIG. 6 is a top view of the connector coupled to a flat cable and mounted in a wired electrical enclosure or panel.
Figure 7:
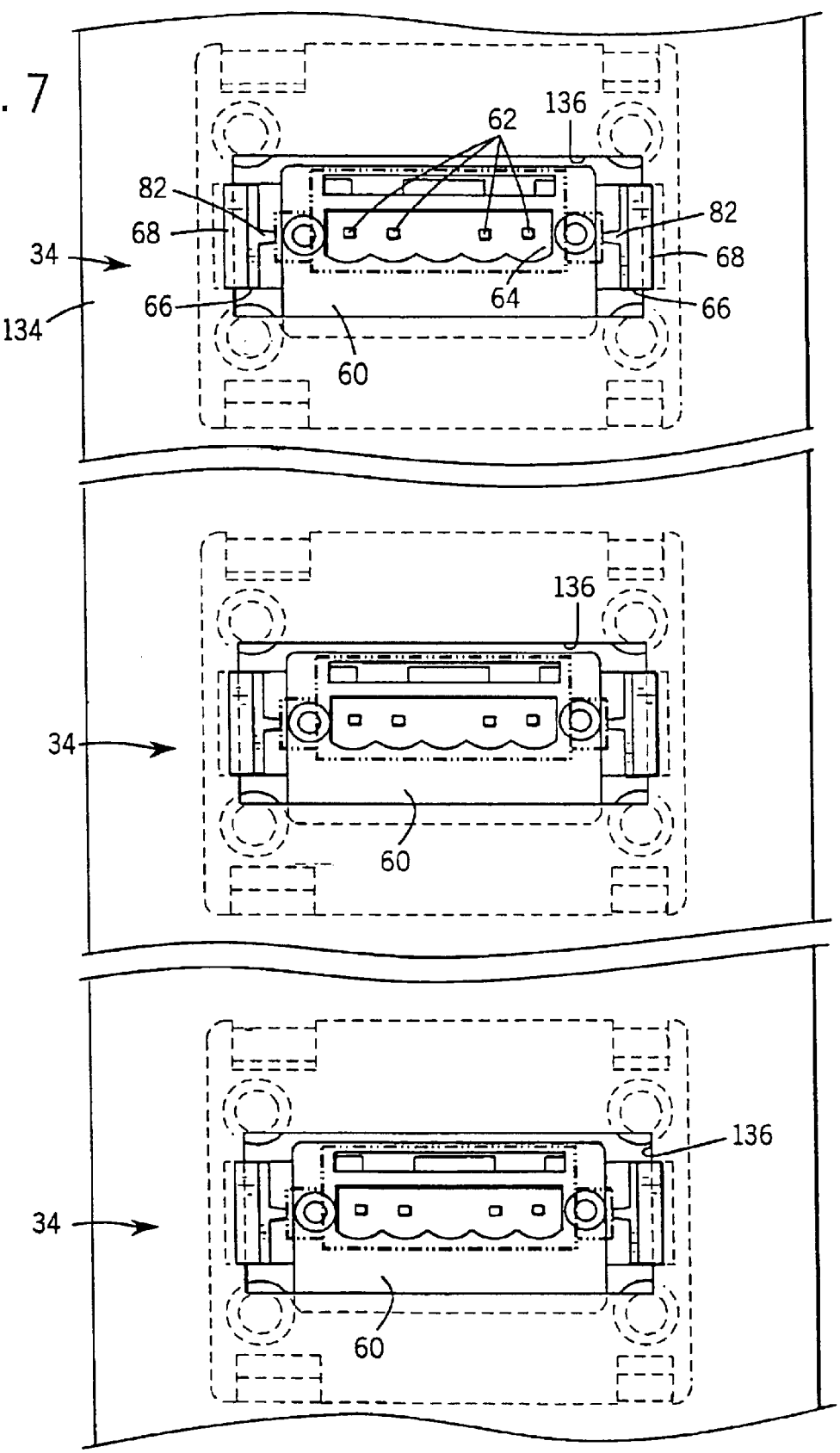
FIG. 7 is a front elevational view of a portion of the panel shown in FIG. 6, with a series of connectors secured in corresponding apertures for wiring of individual components.
Figure 8:
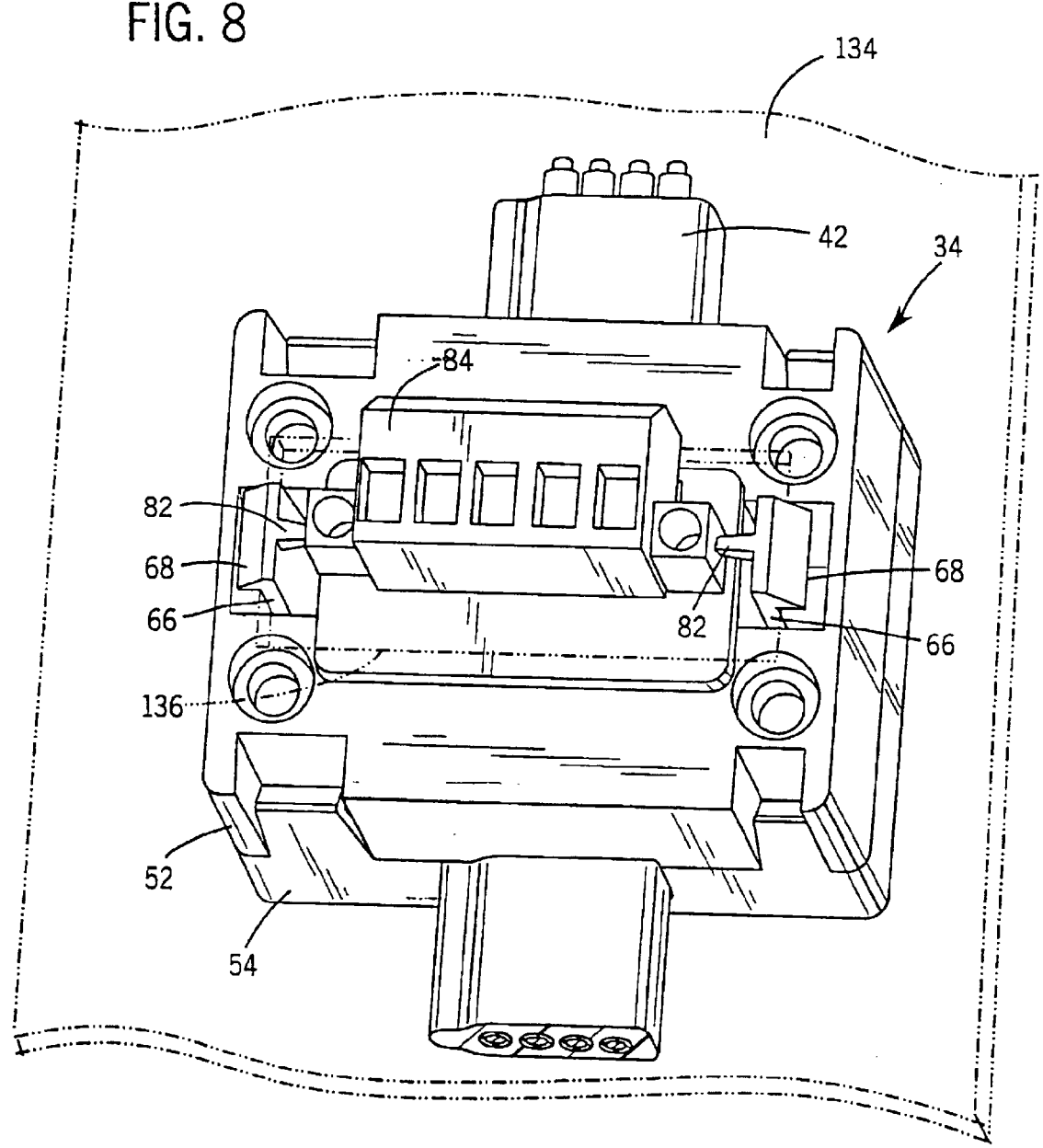
FIG. 8 is a perspective view of one of the connectors shown in FIG. 7 mounted in a panel aperture.
Figure 9:
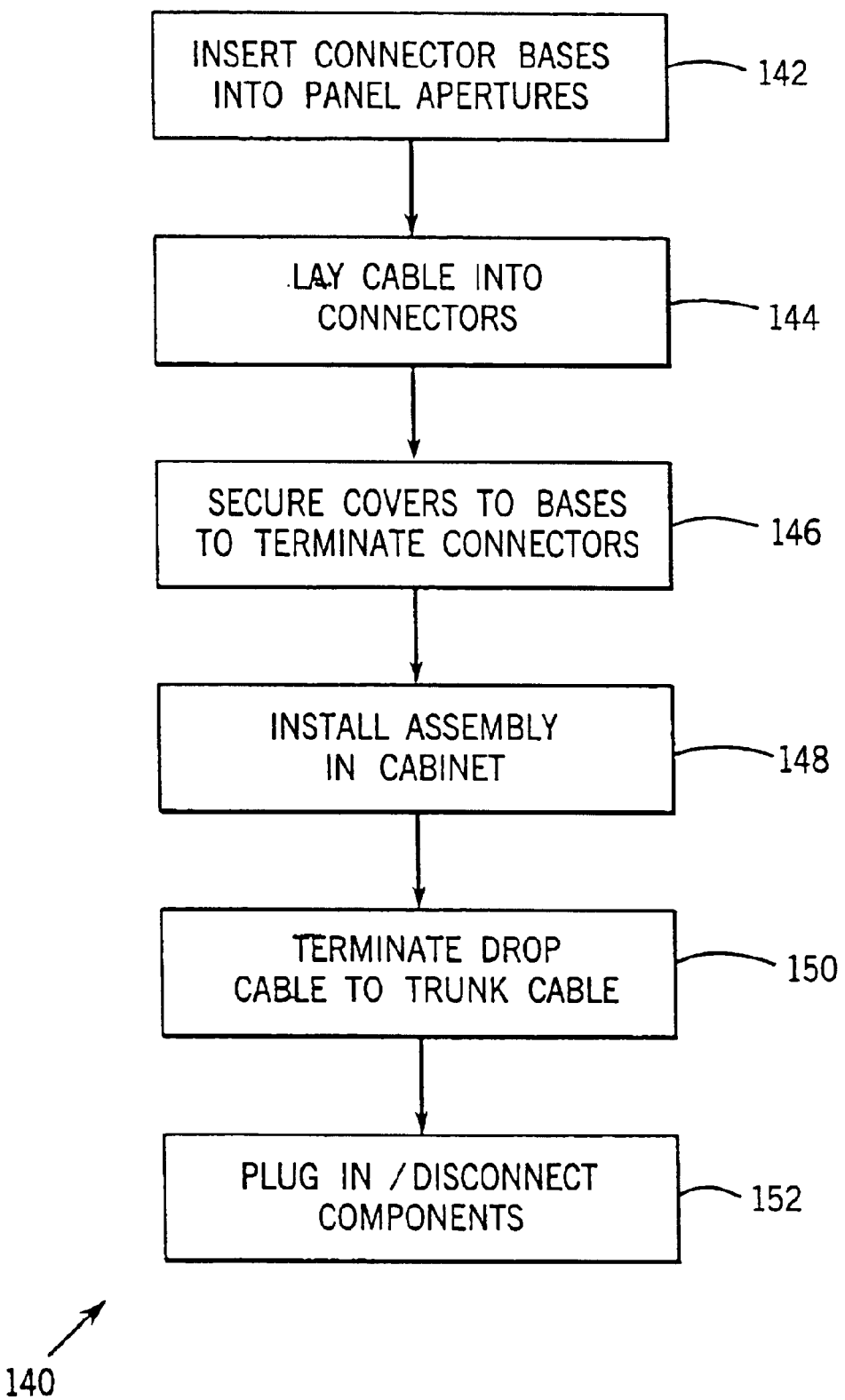
FIG. 9 is a flow chart illustrating steps in assembly of the wiring topography illustrated in the foregoing figures.

With the connector base thus pre-assembled, the connectors are coupled to a support panel and the drop cable assemblies may be assembled as illustrated in FIGS. 6, 7 and 8, and as explained through the process summarized in FIG. 9. In particular, as shown in FIG. 6, the connector is designed to be fitted within and supported on a panel 134. Panel 134 may be detachable from the enclosure described above for facilitating pre-assembly of the panels with the drop cable assemblies. In the embodiment illustrated in FIG. 6, panel 134 is provided with an aperture 136 dimensioned to receive retaining arms 66 of the connector base 52. As the connector base is urged into the aperture from a rear side, the arms are deflected until projections 68 are free to extend and contact an opposite side of panel 134 to retain the connector base 52 in place. In this position, the connector can be retained or removed from the panel. It should be noted, however, that as described above, and as shown in FIG. 6, once a plug 84 of a component cable 40 is inserted into the receptacle of the connector base, interference extensions 82 of retaining arms 66 are prevented from elastically deforming for removal of the connector. Thus, the components may be freely coupled to the connectors without the risk of accidental ejection of the connector from the panel.

FIG. 7 illustrates a series of the connectors assembled on a support panel 134. As shown in FIG. 7, an aperture 136 is provided for each connector, with the connector being snapped into place or secured within the aperture as described above via retaining arms 66 and their corresponding projections 68. Once in place, the body of the connector is resident behind the panel, with the socket 60 being exposed through the aperture. Component cables may then be coupled directly to the connectors, as desired, both during initial installation and for subsequent servicing. In a typical installation, it is contemplated that the apertures 136 of panel 134 may be configured as knock-outs which may be removed for installation of connectors at convenient locations along the panel.

FIG. 8 illustrates a single connector installed on panel 134 (illustrated in broken lines) with a component cable plug 84 installed. Again, the connector is retained within an aperture 136 via retaining arms 66, and the retaining arms are prevented from permitting removal of the connector by interference between extensions 82 and the body of plug 84. As noted above, the particular geometry and dimensions of extensions 82 may be adapted to the geometry of plug 84.

FIG. 9 illustrates exemplary steps in the assembly of the foregoing structure in a typical application. The assembly procedure, designated generally by reference numeral 140 in FIG. 9, begins with insertion of the connector bases into panel apertures, as noted at step 142. As described above, the apertures may be provided as knock-outs in a removable metallic support panel. The connector bases are installed by simply pressing the front side of the base into a corresponding aperture to snap retaining arms and their corresponding projections 68 into place to expose the socket of each connector through the aperture.

At step 144 the cable is placed into the connector covers. In particular, in the illustrated embodiment, the flat drop cable is secured within the cable receiving surfaces of the covers, with the physical key being positioned beneath the cable securement projections 74 (see FIG. 4). In this position, the covers may be slid along the cable for positioning over corresponding bases secured to the support panel. At step 146 the covers are secured to the bases and contact is completed with conductors in the cable and the connector bases. In particular, during a first phase of installation the covers may be snapped into place on the bases with retaining clips 56 entering into recesses 58 of the bases. Thereafter, fasteners 78 are engaged within the threaded apertures 90 of the base and are driven into place to force the teeth 96 of the connector conductors into electrical engagement with corresponding conductors within the cable.

With the connectors thus terminated to complete the cable assemblies, the assembly may be installed into an enclosure or cabinet, such as within a support structure of a wireway as described above. It should be noted that, when assembled in accordance with the present procedure, the cable assemblies may be removed from the panel, or the entire structure may be processed as a unit. For example, cable assemblies may be prefabricated as independent assemblies, as illustrated in FIG. 3, or the cable assembly may be prefabricated and stored with the support panel for later assembly in the enclosure.

At step 150, the drop cable is terminated with the trunk cable. As noted above, this termination may be carried out via connectors housed within the trunk cable wireway and splice cables. Alternatively, T-type connectors or similar hardware may be provided for coupling individual conductors of the trunk cable assembly to the drop cable assemblies. Finally, at step 152, each component of the system may be individually coupled to the network by interfacing a corresponding connector element, such as a plug, with the pre-assembled connectors. Also, as noted above, the structure thus permits components to be freely added to and removed from the system, both during initial installation and for subsequent servicing, without requiring interruption in operation of downstream components.

Figure 10:
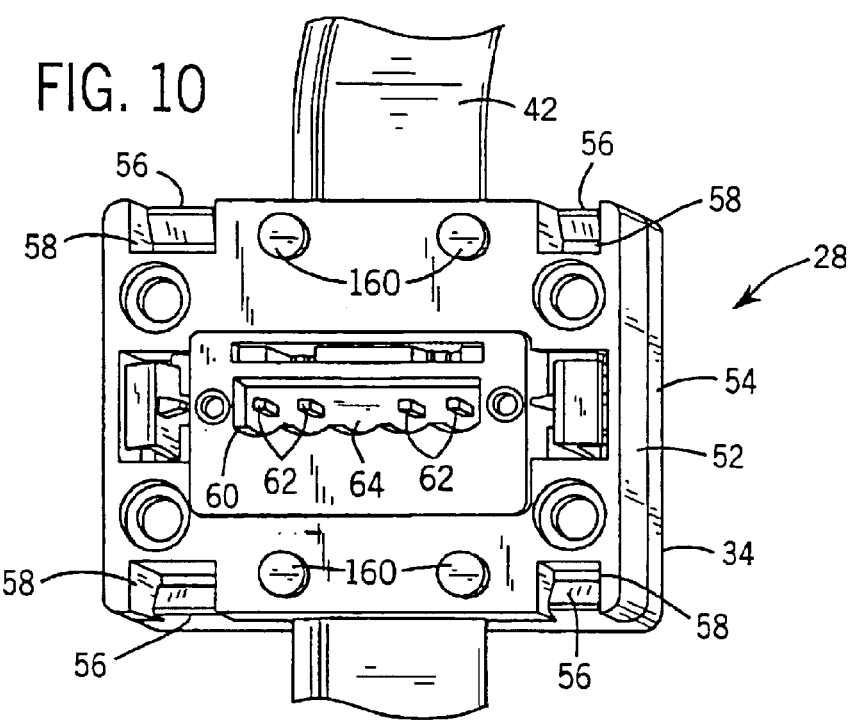
FIG. 10 is a perspective view of an exemplary alternative embodiment of the connector including integral standoffs for accommodating different thicknesses of support panel material, particularly where the connector is provided behind the support panel.
Figure 11:
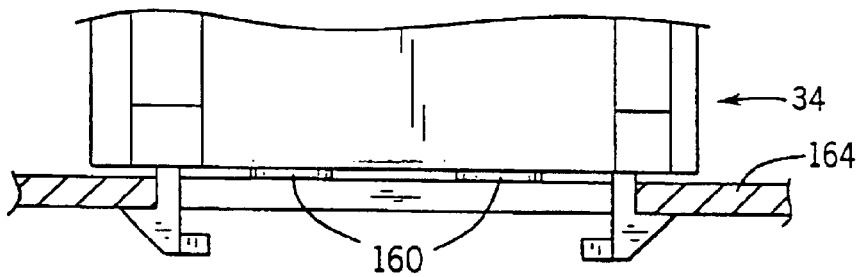
FIG. 11 is a top view of the connector of FIG. 10, mounted within a panel of a first, reduced thickness.
Figure 12:
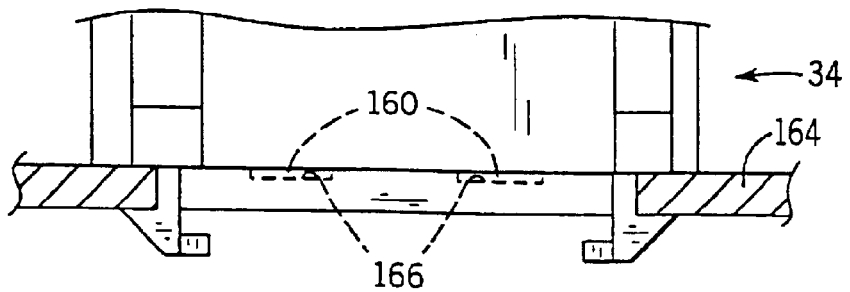
FIG. 12 is a top view of the connector of FIG. 10, mounted in a panel thicker than that illustrated in FIG. 11.

The foregoing structure may be adapted in various ways to accommodate different enclosure or panel configurations, as well as different mounting schemes. Similarly, the connector and mounting approach may be adapted to various types and thicknesses of support panel. FIGS. 10, 11 and 12 illustrate one such alternative configuration, presently preferred where several different thicknesses of support panel are employed for the connector mounted behind the support panel. As shown in FIG. 10, the connector base is provided in this alternative configuration with integral risers or standoffs 160 extending from the face thereof which contacts the rear side of the support panel when the connector is mounted in the snap-action mounting procedure described above. The standoffs 160 may be formed integrally with the connector base. Alternatively, the standoffs may be added to the connector base or may be removable structures which are employed when needed.

FIG. 11 illustrates the connector of FIG. 10 installed in a reduced-thickness plate 162. As described above, the support plate or panel is provided with an aperture through which the connector receptacle is accessible. Due to the reduced thickness of the support panel, however, the standoffs 160 contact the rear portion of the panel adjacent to the aperture, to allow projections 168 of the resilient retaining arms to securely contact the panel and maintain tight engagement of the connector within the aperture. As shown in FIG. 12, where such connectors are employed with integral standoffs, and thicker plates are to be accommodated, recesses or apertures 164 may be provided in locations corresponding to the positions of the standoffs 160. The recesses 164 may also be configured as knockouts in the panel, or may be drilled, punched, or formed by any other suitable manufacturing operation. When installed, the recesses receive standoffs 160, allowing the connector to be, again, tightly engaged within the panel aperture. As will be appreciated by those skilled in the art, similar techniques may be employed, with recesses of varying depths, to accommodate corresponding support panel thicknesses, or multiple standoffs of varying height may be provided in a similar manner.

While the invention may be susceptible to various modifications and alternative forms, specific embodiments have been shown and described herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electrically wired device enclosure comprising:
 a first and second enclosed cable routing paths extending along at least one enclosed device mounting area;
 first and second cable segments having an insulation layer and a plurality of conductors disposed therein, the first and second cable segments being disposed within the first and second cable routing paths, and coupled to one another such that conductors of the first cable segment are electrically coupled to corresponding conductors of the second cable segment; and
 a device connector assembly including at least one device connector having insulation piercing elements for contacting the conductors of at least one of the cable segments through the insulation layer thereof, the device connector being configured to mate with a device cable from a device disposed and enclosed in the device enclosure.

2. The enclosure of claim 1, wherein the first and second cable segments are electrically in parallel to each other.

3. The enclosure of claim 1, wherein the first and second routing paths comprise first and second wireways respectively.

4. The enclosure of claim 1, wherein the first cable segment comprises a first cable and the second cable segment comprises a second cable.

5. The enclosure of claim 4, wherein the first cable is substantially identical to the second cable.

6. The enclosure of claim 4, wherein the first and second cable are electrically coupled to one another via a tap connector.

7. The enclosure of claim 1, wherein the conductors comprise power conductors.

8. The enclosure of claim 7, wherein the conductors comprise data conductors.

9. An electrical component system comprising:
 a first and second sections, each section comprising:
  at least one device disposed and enclosed within the section;

a cable segment including an insulation layer and a plurality of power and data conductors disposed therein;

an enclosed cable routing path extending along at least one enclosed device mounting area, the cable segment being disposed within the respective routing path; and a device connector assembly including at least one device connector having piercing elements for contacting the conductors of the respective cable segment through the insulation layer thereof, the device connector being configured to mate with a device cable from a device disposed and enclosed in the respective section; and a section connector such that the section connector electrically couples the second cable segment of the first section with the first cable segment of the second section, wherein power and data conductors of the cable segment of the first and second sections are electrically coupled to one another for providing power and data signals to the respective devices of the respective sections.

10. The system of claim 9, wherein the conductors of each cable segment comprise two power conductors disposed in flanking positions with respect to two data conductors.

11. The system of claim 10, wherein the device connector assemblies are electrically in parallel with respect to one another.

12. The system of claim 9, wherein the first and second cable segments comprise first and second cables.

13. The system of claim 12, wherein the first and second cables are electrically coupled to one another via a tap connector.

14. The system of claim 13, wherein the first and second cables are substantially identical.

15. The system of claim 9, wherein the conductors in the first segment and the second segment have the same electrical class rating.

16. The system of claim 15, wherein the electrical class rating is an NEC Class 1 rating.

17. An electrical enclosure, comprising:
a plurality of devices disposed within the enclosure;
a first enclosed cable routing path extending along at least a first enclosed device mounting area;
a second enclosed cable routing path extending along at least a second device mounting area;
a cable system, the cable system comprising:
  a first cable segment disposed within the first cable routing path and including an insulative layer and a plurality of conductors disposed therein; and
  a second cable segment disposed within the second cable routing path and including an insulative layer and a plurality of conductors disposed therein;
  wherein power and data conductors of the first and second cable segments are electrically coupled to one another for providing power and data signals to the respective devices; and
  a device connector assembly including at least one device connector in electrical communication with the conductors of at least one of the cable segments, the device connector being configured to mate with a device cable from one of the plurality of devices.

18. The enclosure of claim 17, wherein the first segment comprises a first cable and the second segment comprises a second cable.

19. The enclosure of claim 18, wherein the enclosure comprises a tap connector that electrically couples the first and second segments.

20. The enclosure of claim 17, wherein the device connector assemblies are electrically in parallel to one another.

21. The enclosure of claim 17, wherein the conductors of each cable segment comprise two power conductors disposed in flanking positions with respect to two data conductors.

22. The enclosure of claim 17, wherein the device connector comprises a piercing element configured to contact the conductors of the connected cable segment through the insulative layer thereof.

23. An electrical component system comprising:
first and second component mounting areas;
a plurality of electrical components disposed in the mounting areas;
a first wiring path extending to a location adjacent to the first component mounting area;
a second wiring path extending to a location adjacent to the second mounting area;
a first cable length disposed in the first wiring path and a second cable length disposed in the second wiring path, each cable length comprising:
  an insulative jacket;
  a set of power conductors disposed of within the insulative jacket; and
  a set of data conductors disposed of with the insulative jacket;
a plurality of device connectors coupled to at least one of the first and second cable lengths, each device connector having conductive members electrically coupled to the power and data conductors of the respective cable length;
a plurality of device cable assemblies, each device cable assembly being coupled between respective components for transmitting power and data signals to the respective components electrically via the device connectors; and
wherein the power and data conductors of the first and second cable lengths are electrically coupled to one another for providing power and data signals to the respective devices of the respective areas.

24. The electrical component system of claim 23, wherein the first and second cable length comprise first and second cables, respectively.

25. The electrical component system of claim 24, where the first and second cables are coupled via a tap connector.

26. A method for supplying data and power to panel mounted electrical components, the method comprising the steps of:
disposing and enclosing first and second cable segments, having a plurality of conductors disposed therein, within respective first and second wiring paths adjacent to respective enclosed component mounting areas; and
coupling at least one device connector to at least one of the first and second cable segments by forcing insulation piercing conductive elements through insulation surrounding at least one of the cable segments and into electrical communication with the respective conductors.

27. The method of claim 26, further comprising the step of electrically coupling the first cable segment to the second cable segment via a tap connector.

28. The method of claim 27, wherein the step of coupling further comprises the step of coupling the electrical components to the device connector electrically in parallel.

* * * * *